United States Patent
Boulton

(10) Patent No.: US 11,548,513 B2
(45) Date of Patent: Jan. 10, 2023

(54) METHOD AND SYSTEM FOR EVALUATING CONTEXTUAL RISK PROFILES IN A VEHICLE

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 78 days.

(21) Appl. No.: 16/611,343

(22) PCT Filed: Oct. 17, 2017

(86) PCT No.: PCT/EP2017/076522
§ 371 (c)(1),
(2) Date: Nov. 6, 2019

(87) PCT Pub. No.: WO2019/076444
PCT Pub. Date: Apr. 25, 2019

(65) Prior Publication Data
US 2020/0079382 A1  Mar. 12, 2020

(51) Int. Cl.
*B60W 40/04* (2006.01)
*B60W 30/16* (2020.01)
(Continued)

(52) U.S. Cl.
CPC ............ *B60W 40/04* (2013.01); *B60W 30/16* (2013.01); *B60W 30/18163* (2013.01); *G05D 1/0055* (2013.01); *G05D 1/0088* (2013.01); *G07C 5/08* (2013.01); *B60W 2420/42* (2013.01); *B60W 2554/00* (2020.02); *G05D 2201/0213* (2013.01)

(58) Field of Classification Search
CPC ................ B60W 40/04; B60W 30/16; B60W 30/18163; B60W 2554/00; B60W 2420/42; G05D 1/0055; G05D 1/0088; G05D 2201/0213; G07C 5/08
See application file for complete search history.

(56) References Cited

U.S. PATENT DOCUMENTS

| 6,175,803 B1 | 1/2001 | Chowanic et al. |
| 2004/0046646 A1* | 3/2004 | Eskridge ............... G08G 1/127 235/487 |

(Continued)

FOREIGN PATENT DOCUMENTS

| EP | 2887334 A1 | 6/2015 |
| WO | 2018/106757 A1 | 6/2018 |

OTHER PUBLICATIONS

Photograph of state of California I"ipstick") license plate showing registration stickers of month and year. From www.plateshack.com, obtained using Wayback machine.(Apr. 17, 2016) (Year: 2016).*

(Continued)

*Primary Examiner* — Peter D Nolan
*Assistant Examiner* — Tanya C Sienko
(74) *Attorney, Agent, or Firm* — Trop, Pruner & Hu, P.C.

(57) ABSTRACT

A method for evaluating contextual risk profiles at a computing device (110, 212, 312) in a vehicle (310), the method including obtaining information about a proximate vehicle (320, 330); utilizing the information to create a risk profile for the proximate vehicle (320, 330); and based on the risk profile, initiating an action at computing device (110, 212, 312).

19 Claims, 6 Drawing Sheets

(51) Int. Cl.
*B60W 30/18* (2012.01)
*G05D 1/00* (2006.01)
*G07C 5/08* (2006.01)

(56) References Cited

U.S. PATENT DOCUMENTS

| | | | |
|---|---|---|---|
| 2005/0033482 A1* | 2/2005 | Koljonen | G08G 1/017 701/1 |
| 2013/0058531 A1* | 3/2013 | Hedley | G06V 20/00 382/105 |
| 2014/0195214 A1 | 7/2014 | Kozloski et al. | |
| 2014/0236414 A1 | 8/2014 | Droz et al. | |
| 2014/0336869 A1* | 11/2014 | Bou-Ghannam | G07C 5/008 701/31.9 |
| 2016/0068156 A1 | 3/2016 | Horii | |
| 2016/0375900 A1* | 12/2016 | Laur | B60W 30/18163 701/41 |
| 2017/0120926 A1* | 5/2017 | Yoon | B60W 30/0956 |
| 2017/0185854 A1 | 6/2017 | Lai | |
| 2017/0261990 A1* | 9/2017 | Lei | B60W 50/14 |
| 2017/0287233 A1* | 10/2017 | Nix | G08G 1/166 |

OTHER PUBLICATIONS

Specification filed in U.S. Appl. No. 62/430,814 (Dec. 6, 2016) (Pedersen et al.) (Year: 2016).*
Stacy Liberatore, "Slower but safer: Waze navigation app adds ability to avoid crime hotspots", DailyMail.com, published Jun. 17, 2016, updated Aug. 17, 2016 (7 pages).
International Searching Authority, International Search Report and Written Opinion for International application No. PCT/EP2017/076522, dated Jul. 2, 2018 (13 pages).
European Patent Office, Communication pursuant to Article 94(3) for Appl. No. 17791321.7 dated Jun. 21, 2022 (7 pages).

* cited by examiner

METHOD AND SYSTEM FOR EVALUATING CONTEXTUAL RISK PROFILES IN A VEHICLE

FIELD OF THE DISCLOSURE

The present disclosure relates to operation of autonomous vehicles or to provision of driver assistance in non-autonomous vehicles, and in particular relates to performing actions or providing alerts within an autonomous vehicle or a driver assistance system.

BACKGROUND

Driver assistance is becoming standard in modern vehicles. For example, vehicles may be equipped with sensors to detect lane departure or adjacent vehicles, may be provided with a cruise control that can vary speed based on vehicles in front of the current vehicle, may be equipped with sensors and processors to provide collision warnings, among other such driver assistance.

Further, systems are being implemented to create autonomous vehicles that would allow the vehicle to drive itself, with or without passengers. Specifically, autonomous vehicles are likely to become widely used in coming years and may be used for many purposes, including autonomous deliveries, autonomous taxicab, vehicle sharing infrastructures in which vehicles relocate itself between users, among other options.

For both the driver assistance and autonomous vehicles, a processor on the vehicle makes decisions based on vehicles surrounding the current vehicle. The decisions made typically assume that the vehicles surrounding the current vehicle are in good working order.

BRIEF DESCRIPTION OF THE DRAWINGS

The present disclosure will be better understood with reference to the drawings, in which.

DETAILED DESCRIPTION OF THE DRAWINGS

Figure 1:
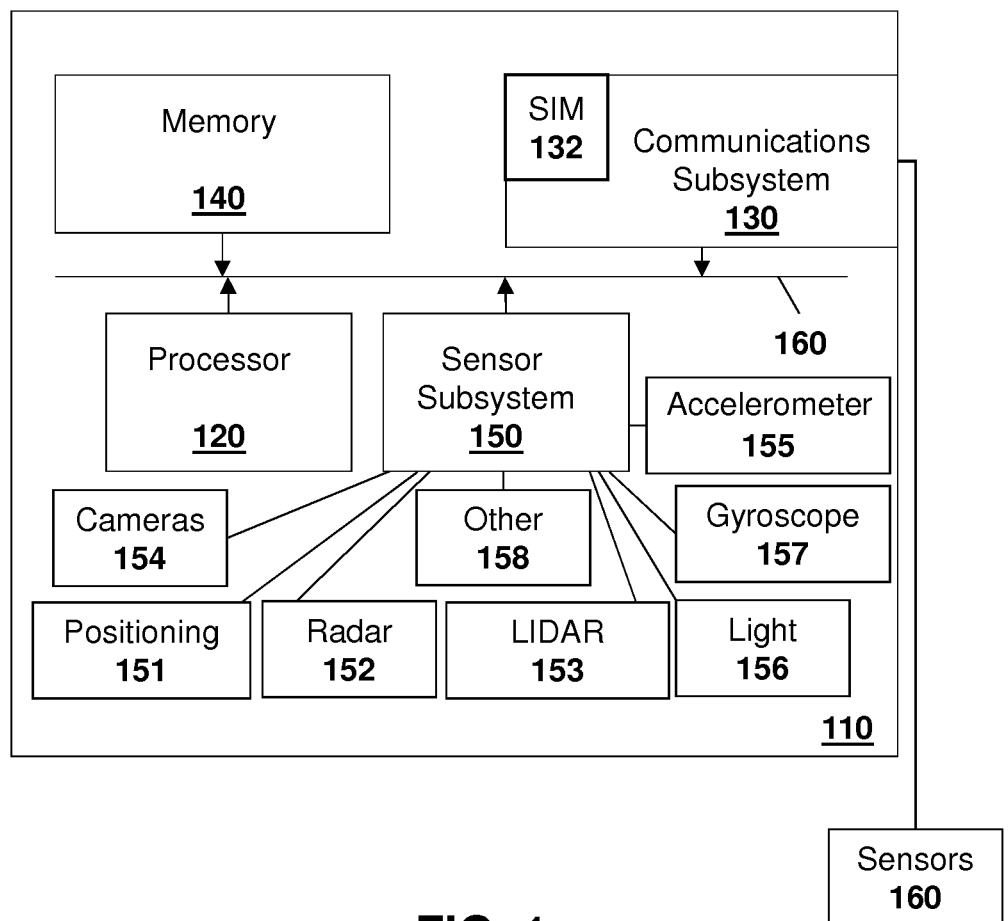
FIG. 1 is block diagram showing a computing device capable of being used in a vehicle.

The present disclosure provides a method for evaluating contextual risk profiles at a computing device in a vehicle, the method comprising: obtaining information about a proximate vehicle; utilizing the information to create a risk profile for the proximate vehicle; and based on the risk profile, initiating an action at computing device.

The present disclosure further provides a computing device in a vehicle for evaluating contextual risk profiles, the computing device comprising: a processor; and a communications subsystem, wherein the computing device is configured to: obtain information about a proximate vehicle; utilize the information to create a risk profile for the proximate vehicle; and based on the risk profile, initiate an action at computing device.

The present disclosure further provides a computer readable medium for storing instruction code for evaluating contextual risk profiles, which when executed by a processor of a computing device in a vehicle cause the computing device to: obtain information about a proximate vehicle; utilize the information to create a risk profile for the proximate vehicle; and based on the risk profile, initiate an action at computing device.

In accordance with embodiments of the present disclosure, a computing device on a vehicle may establish a risk rating for surrounding vehicles based on publicly available data. In particular, in accordance with embodiments of the present disclosure, a computing device may automatically identify a road worthiness status of a surrounding vehicle and thereby calculate a risk rating for such vehicle. Such contextual information may be provided to the computing device without a dependency on vehicle to vehicle (V2V) communications in some embodiments.

In accordance with other embodiments of the present disclosure, risk profiles may take into account given locations, given routes or other factors based on information stored on, or retrieved by, the computing device.

Based on the risk profile, in accordance with the embodiments herein various actions may be taken by the computing device on the vehicle. Such actions may include risk mitigation by, for example, allowing more space between the higher risk vehicle and the current vehicle in one embodiment. In other embodiments, risk mitigation may involve changing lanes, pulling over and letting the at-risk vehicle pass, among other options. In other embodiments, the actions may involve providing alerts to vehicle drivers warning of the risk, identifying the at-risk vehicle, suggesting actions or other such alerts. Other actions are also possible.

In vehicle operations, a computing device may be included on a vehicle, which may include or be connected to a plurality of sensors in order to provide the vehicle computing device with information regarding the vehicle and its environment. Such information may include, but is not limited to, information concerning the current location of the vehicle, operational parameters such as the engine temperature or tire pressure for the vehicle, the fuel state or charge state for the vehicle, as well as environmental conditions such as the location of vehicles and stationary objects around the vehicle, road information including traffic lights, road conditions, traffic conditions, among other factors.

Such computing device may allow for autonomous vehicle operation in some embodiments. In other embodiments, the computing device may allow for driver assistance.

As used herein, the term vehicle can include any motorized vehicle such as a truck, tractor, car, boat, motorcycle, snow machine, among others.

One computing device for a vehicle is shown with regard to FIG. 1. However, the computing device of FIG. 1 is merely an example and other computing devices could equally be used in accordance with the embodiments of the present disclosure.

Reference is now made to FIG. 1, which shows an example computing device 110. Computing device 110 can be any type of electronic device, including, but not limited to, vehicles or devices for vehicles, including purpose built vehicle computing devices, mobile devices such as smartphones or cellular telephones, among other options.

Computing device 110 comprises at least one processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows computing device 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the computing device is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the computing device 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, computing device 110 may access data or programmable logic from an external storage medium, for example through communications subsystem 130.

In the embodiment of FIG. 1, computing device 110 may utilize a plurality of sensors, which may either be part of computing device 110 in some embodiments, or may communicate with computing device 110 in other embodiments. For internal sensors, processor 120 may receive input from a sensor subsystem 150.

Examples of sensors in the embodiment of FIG. 1 include a positioning sensor 151, a Radio Detection And Ranging (Radar) sensor 152, Light Detection and Ranging (LIDAR) sensors 153, one or more image sensors 154, accelerometer 155, light sensors 156, gyroscopic sensors 157, and other sensors 158. Other sensors may be any sensor that is capable of reading or obtaining data that may be useful for computing device 110. However, the sensors shown in the embodiment of FIG. 1 are merely examples, and in other embodiments different sensors or a subset of sensors shown in FIG. 1 may be used.

While the above sensors are shown internally for computing device 110, in some embodiments sensors may be external to computing device 110, and communicate with computing device 110, for example through communications subsystem 130. Such external sensors are shown as sensors 160 in the embodiment of FIG. 1.

Communications between the various elements of computing device 110 may be through an internal bus 160 in one embodiment. However, other forms of communication are possible.

The computing device from FIG. 1 may be used in a variety of environments. One example environment in which the computing device may be used is shown with regard to FIG. 2.

Figure 2:
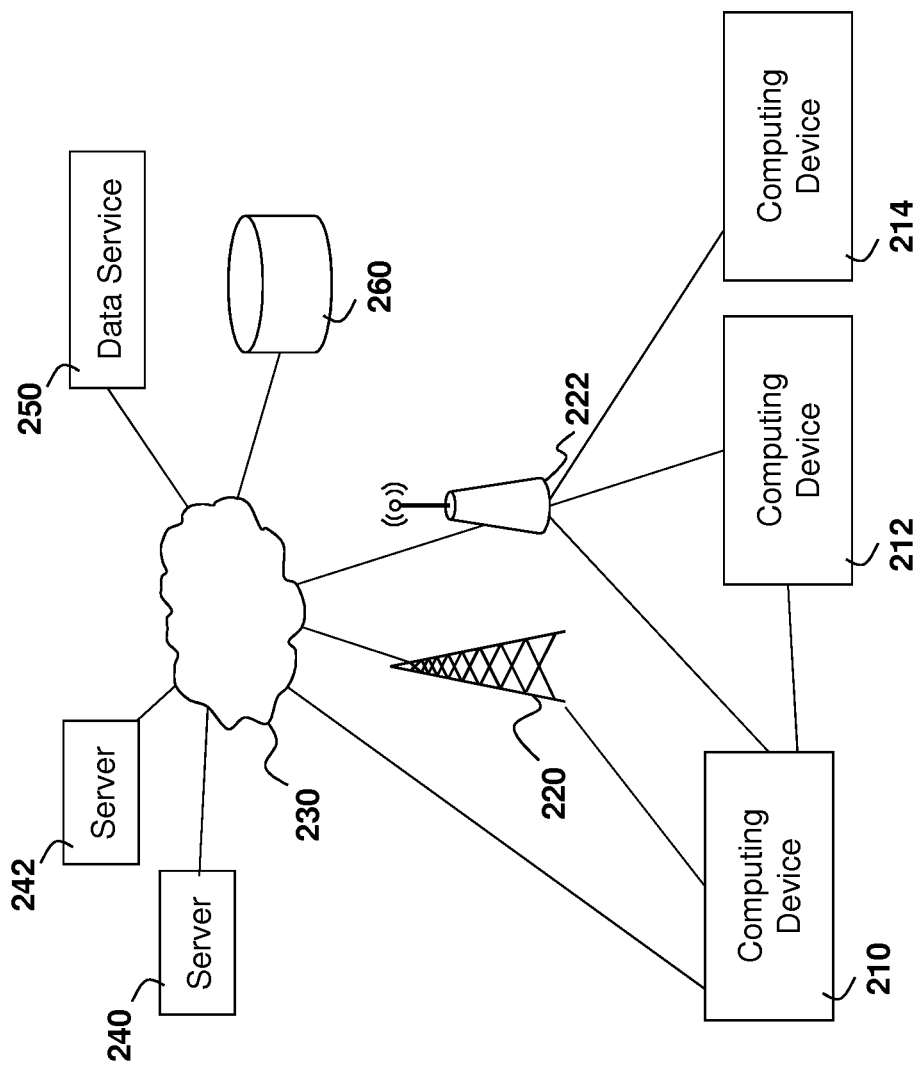
FIG. 2 is a block diagram showing an environment for the operation of the computing device of FIG. 1.

Referring to FIG. 2, three computing devices, namely computing device 210, computing device 212, and computing device 214 are provided.

In the example of FIG. 2, computing device 210 may communicate through a cellular base station 220 or through an access point 222. Access point 222 may be any wireless communication access point. For example, access point 222 may be a WiFi router or a private router network.

Further, in some embodiments, computing device 210 could communicate through a wired access point such as Ethernet or fiber, among other options, for example when an electric vehicle is connected to a charging port.

The communication may then proceed over a wide area network such as Internet 230 and proceed to servers 240 or 242.

Similarly, computing device 212 and computing device 214 may communicate with servers 240 or server 242 through one or both of the base station 220 or access point 222, among other options for such communication.

In other embodiments, any one of computing devices 210, 212 or 214 may communicate through satellite communication technology. This, for example, may be useful if the vehicle with the computing device is travelling to areas that are outside of cellular coverage or access point coverage.

In other embodiments, computing device 212 may be out of range of access point 222, and may communicate with computing device 210 to allow sensor apparatus 210 to act as a relay for communications.

Communication between computing device 210 and server 240 may be one directional or bidirectional. Thus, in one embodiment computing device 210 may provide information to server 240 but server 240 does not respond. In other cases, server 240 may provide information to computing device 210. In other cases, two-way communication may exist between computing device 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of computing devices 210, 212, 214, etc. For example, the server may be located essentially anywhere so long as it has network access to communicate with computing devices 210, 212, 214, etc.

Server 240 may, for example, be a fleet management centralized monitoring station for an autonomous taxi fleet. In this case, server 240 may receive information from computing devices associated with autonomous vehicles, providing information such as the location of such vehicles, status of such vehicles, any unusual events including sudden decelerations, among other data.

In other cases, server 240 may be a subscription or non-subscription based web service to provide data to a vehicle.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

Data repository or database 260 may for example provide information such as vehicle maintenance reports, vehicle status, vehicle plate renewal reports, among other such information.

The types of information provided by data service provider 250 or the data repository or database 260 is not limited to the above examples and the information provided could be any data useful to server 240 or computing device 210.

In some embodiments, information from data service provider 250 or the data repository from database 260 can be provided to one or more of computing devices 210, 212, or 214 for processing at those computing devices.

Figure 3:
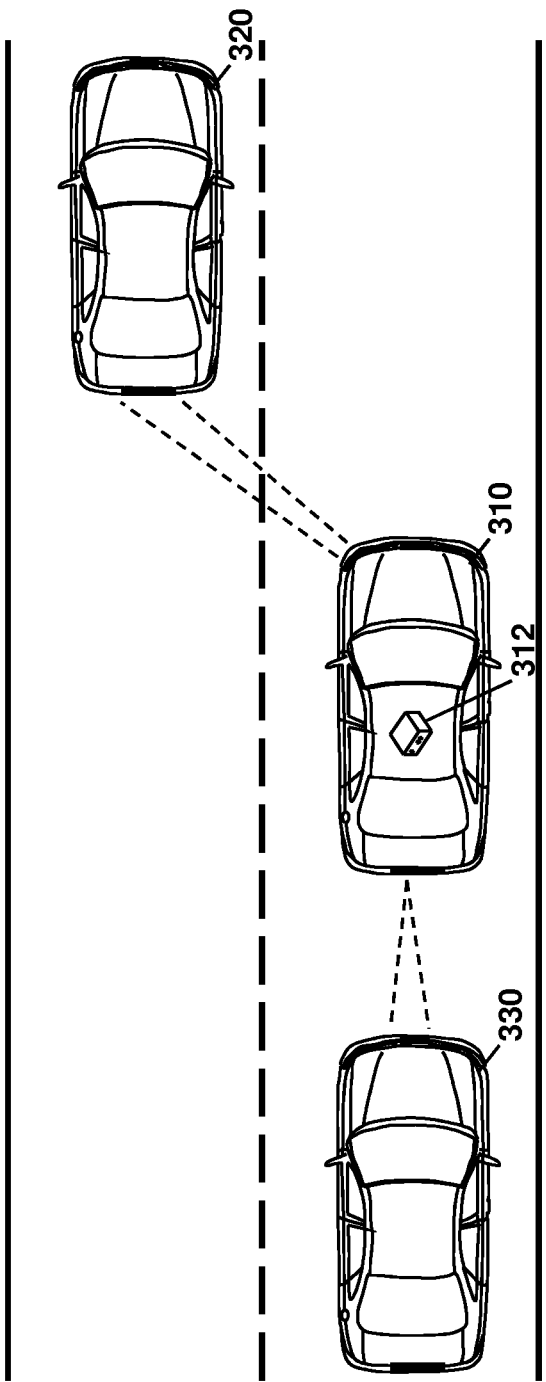
FIG. 3 is a block diagram showing a vehicle sensing proximate vehicles.

Reference is now made to FIG. 3, which shows one example driving situation. In particular, in the embodiment of FIG. 3, a vehicle 310 has a computing device 312 which performs the processing for the vehicle. Computing device 312 may allow for vehicle 310 to be an autonomous vehicle or to provide warnings to drivers among other actions. Computing device 312 may for example be computing device 110 or 210 from FIGS. 1 and 2.

In the example of FIG. 3, a vehicle 320 is in front of vehicle 310, but in an adjacent lane.

Further, a vehicle 330 is a behind vehicle 310 in the example of FIG. 3.

As described below, vehicle 310 may use computing device 312 along with sensors such as a camera to visually identify the vehicles that are surrounding it. For example, vehicle 320 may be travelling in the same direction and in front of vehicle 310. In this regard, vehicle 310, using a camera and a computing device 312 may find an image of a license plate on vehicle 320. Thereafter, computing device 312 may use optical character recognition (OCR) to identify the vehicle.

Based on the identification, a lookup may occur to provide details about vehicle 320. Such details may include publicly available data about vehicle 320, such as vehicle inspections, tax or license plate fees that have been paid, maintenance records, among other such information. For example, such data may be retrieved through an Open Government License in some cases. In other cases, such data may be available through third party, non-government, stores. Other options for the data source are possible.

The vehicle 310, utilizing a camera and computing device 312 may further identify the make and model of the vehicle and ensure that the data received from the license plate reading matches the make and model of the vehicle. If not, this may indicate that either an OCR error has occurred and the image of the license but may be recaptured and reinterpreted. In other embodiments, the license plate may not belong to the vehicle and actions by the vehicles 310 may be taken.

Similarly, if vehicle 330 includes a front license plate, then vehicle 310, using a rearwardly facing camera and computing device 312, may capture an image of the license plate, perform optical character recognition on the license plate, and retrieve data with regard to vehicle 330.

As described below, once computing device 312 has data with regard to vehicle 320 or 330, then vehicle 310 may build a risk profile for such vehicles and based on the risk profile may take an action. Such actions as described below may include leaving a larger gap between the vehicle and the vehicle in front, changing lanes, allowing a vehicle to pass, signaling a driver, including audio or visual warnings, among other options.

Figure 4:
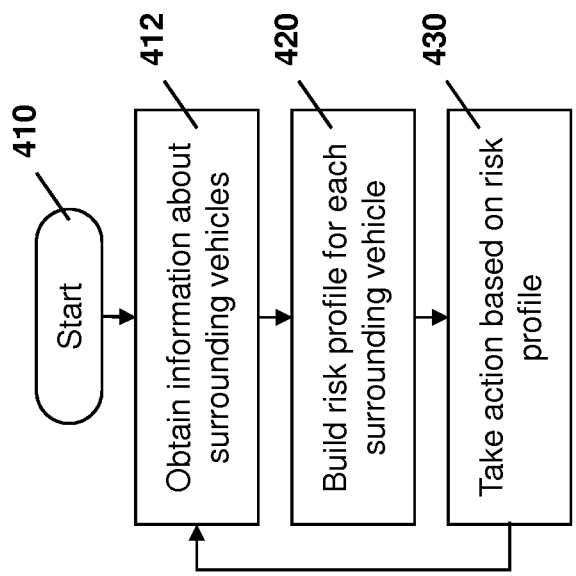
FIG. 4 is a process diagram showing a process for building a risk profile for surrounding vehicles and taking action based on the risk profile.

In particular, reference is now made to FIG. 4, which shows a process at a computing device on a vehicle. The process of FIG. 4 starts at block 410 and proceeds to block 412, at which the computing device obtains information about surrounding vehicles. In one embodiment, such information about surrounding vehicles may involve capturing license plate data and using optical character recognition technology to identify the vehicle from the license plate. For example, one such OCR technology is Automatic Number Plate Recognition (ANPR).

In other embodiments, the obtaining information at block 412 may use other mechanisms. For example, the vehicles may have vehicle to vehicle signaling and, in this case, the obtaining information at block 412 may involve communications between the vehicles.

In other embodiments, a vehicle such as vehicle 320 may provide short range communications which may be received by vehicle 310. Such short-range communications may include radio frequency identifier chips within vehicle 320, a Wi-Fi signal from vehicle 320, Bluetooth™ signals from vehicle 320, among other options.

In other embodiments, other identifying information such as Vehicle Information Number (VIN) may be used.

In still further embodiments, facial recognition technology may be used to identify a driver and potentially the vehicle.

Other options for obtaining information are possible.

By being able to obtain vehicle information for vehicles near the computing device, the environmental data at the computing device may be enriched and therefore can aid operational decisions for the vehicle.

The process at FIG. 4 then proceeds from block 412 to block 420, in which a risk profile for the various vehicles near the computing device may be created. Specifically, a computing device such as computing device 312 may use the information obtained at block 412 to perform a database lookup. In this case, computing device 312 would have a communications mechanism such as a cellular data connection, a satellite data connection, among other options.

The lookup of the information may utilize license plate information to obtain information about the vehicle. For example, in the United Kingdom, the Ministry of Transport (MOT) requires an annual test of vehicle safety road worthiness aspects and exhaust emissions for each vehicle and provides a database that is publicly accessible, indicating whether or not a vehicle has passed. Further, other information about the vehicle, including vehicle make, model, fuel type, color, the MOT test date, the expiry of the MOT registration, are included in this database. This database includes information such as the test results, advisory items that were flagged during the test, and failure items that were identified during the test.

One example of a JavaScript Object Notation (JSON) file that is returned based on a search of a specific vehicle is provided in Table 1 below.

TABLE 1

JSON results for MOT query in UK

{
 "make": "FORD",
 "model": "FOCUS",
 "dateFirstUsed": "24 MAY 2013",

TABLE 1-continued

JSON results for MOT query in UK

```
"fuelType": "DIESEL",
"colour": "BLACK",
"motTestReports": [
   {
      "testDate": "5 JUNE 2017",
      "expiryDate": "4 JUNE 2018",
      "testResult": "PASS",
      "odometerReading": 52867,
      "motTestNumber": 497616241716,
      "advisoryItems": [
      ],
      "failureItems": [
      ]
   },
   {
      "testDate": "3 JUNE 2017",
      "expiryDate":"",
      "testResult": "FAIL",
      "odometerReading": 52865,
      "motTestNumber": 551998993501,
      "advisoryItems": [
         "Offside Front tyre on the legal limit"
      ],
      "failureItems": [
         "Nearside Front position lamp(s) not working (1.1.A.3b)",
         "Nearside Front Tyre tread depth below requirements of 1.6mm (4.1.E.1)"
      ]
   },
   {
      "testDate": "25 MAY 2016",
      "expiryDate": "24 MAY 2017",
      "testResult": "PASS",
      "odometerReading": 46388,
      "motTestNumber": 266608185422,
      "advisoryItems": [
      ],
      "failureItems": [
      ]
   }
]
}
```

Table 1: JSON Results for MOT Query in UK

As seen in Table 1 above, the license plate query resulted in a JSON file for a black Ford Focus™ that failed an inspection on Jun. 3, 2017, but passed on Jun. 5, 2017. The causes of the failure is provided as "Nearside Front position lamp(s) not working (1.1.A.3b)" and "Nearside Front Tyre tread depth below requirements of 1.6 mm (4.1.E.1)". Further, an advisory item is listed as: "Offside Front tyre on the legal limit". The issues seem to be resolved on Jun. 5, 2017.

In other embodiments, the vehicle license plate tax may also be checked at the UK MOT database. An example JSON report is shown below with regard to Table 2.

TABLE 2

JSON results for MOT Tax query in UK

```
{
   "co2Emissions": "109 g/km",
   "model": "FOCUS ZETEC TDCI",
   "transmission": "MANUAL",
   "colour": "BLACK",
   "yearOfManufacture": "2013",
   "dateOfFirstRegistration": "24 May 2013",
   "revenueWeight": "1900kg",
   "fuelType": "DIESEL",
   "typeApproval": "M1",
   "vin": "WF0KXXGCBKDP31574",
```

TABLE 2-continued

JSON results for MOT Tax query in UK

```
   "wheelPlan": "2 AXLE RIGID BODY",
   "numberOfDoors": "5",
   "motDetails": "Expires: 04 June 2018",
   "make": "FORD",
   "taxDetails": "Tax due: 01 March 2018",
   "taxed": true,
   "mot": true,
   "taxStatus": "Tax not due",
   "cylinderCapacity": "1560 cc"
}
```

Table 2: JSON Results for MOT Tax Query in UK

While the above examples are provided with regard to the UK MOT databases, similar databases exist in other parts of the world, or may in exist in the future. The present disclosure therefore allows for the obtaining of data from any available source in order to implement the embodiments herein.

In one embodiment, an Internet connection or data connection may not be available from a vehicle. In this case, the computing device may access a local database. Such local database may be updated periodically. For example, such database may be updated when the vehicle parks in a garage overnight and obtains data connectivity.

A local database may include data for vehicles that are registered within a particular radius or vicinity of the current computing device in order to preserve space in some embodiments. In other embodiments, the entire public database may be replicated and stored at the computing device.

Once the lookup is performed and the data retrieved, the computing device may analyze the data to determine a risk profile for the surrounding vehicles. For example, if a surrounding vehicle has failed its MOT test and is therefore considered not roadworthy, this may substantially increase the risk for such a vehicle.

Similarly, if a surrounding vehicle does not have its license plate tax paid then this may indicate some problem and also may increase the risk level.

In some cases, the maintenance profile or test results may be used to build a risk profile. Further, the date of the last inspection or test may be considered when building the risk profile. For example, if the inspection was performed recently, this may lower a risk in a risk profile. However, if the last inspection was almost a year ago, and is set to expire shortly, this may indicate that there is more uncertainty with regard to the road worthiness of the vehicle surrounding the computing device and therefore raise the risk profile.

Further, specific advisory actions or failure items may be considered when building a risk profile. Thus, if an advisory indicated that the brakes are starting to be worn then this may indicate that the vehicle may need additional stopping space. Similarly, if tire tread depth is flagged as being close to worn then this may indicate that the vehicle may have traction issues.

Further, other supplementary data may be considered in the risk profile. For example, weather conditions, time of day, vehicle speed, visual indicators about the state of the surrounding vehicles such as dents, rust or other such factors, as well as other supplementary data may be taken into account when building such a risk profile.

The risk profile may indicate to the computing device that a surrounding vehicle is not in a road legal state, which may increase the chances of collision. Further, if a plate tax or MOT test has expired, in the event of a collision there may be an additional risk because of legal challenges involved with collisions with a potentially uninsured driver.

Even if roadworthy, flags such as advisory items, state of the vehicle, among other factors, may increase the level of risk of surrounding vehicles and may enable the computing device to determine how well a vehicle in the surroundings has been cared for. Therefore, this builds a more detailed understanding of the environment in which the vehicle is operating.

The process then proceeds to block 430 in which an action may be taken based on the risk profile generated at block 420. For example, if a vehicle such as vehicle 310 is an autonomous vehicle, the autonomous vehicle may make a decision to use more caution around high risk vehicles. As indicated above, such high-risk vehicles may be vehicles that are not considered roadworthy, have no license plate tax paid, that have advisories for items which may have been further exacerbated over time, among other options. An autonomous vehicle in this situation may choose to take actions to avoid potential collisions. For example, if the vehicle 310 is behind a vehicle 320 that is deemed to be a high-risk vehicle, then the computing device 312 may cause vehicle 310 to leave a larger gap between itself and the vehicle 320. Alternatively, if vehicle 310 is directly behind vehicle 320 then the autonomous vehicle may choose to change lanes to avoid being directly behind such vehicle.

Similarly, if vehicle 330 is identified as a high-risk vehicle, then computing device 312 may, if vehicle 310 is autonomous, cause the vehicle to change lanes so it is not directly in front of vehicle 330. For example, if the brakes on vehicle 330 are indicated to be close to worn or if the tires are close to worn then vehicle 310 may change lanes in order to avoid a potential collision if sudden braking is required.

Further, even if vehicle 310 is not an autonomous vehicle, computing device 312 may still take actions at block 430. For example, if the risk profile indicates a vehicle exceeds a threshold risk level, computing device 312 may warn a driver, either visually or audibly, that there is a vehicle that needs to be afforded more caution. For example, such indication may be a series of audible alerts and/or a graphical representation of the location of the high-risk vehicle. This may prompt a driver of vehicle 310 to change lanes, leave more room in front of the car, allow the vehicle to pass it, among other such options.

A further action that may be taken at block 430 may be reporting. In particular, the systems in accordance with the embodiments of the present disclosure would support government agencies gathering data about use of vehicles which aren't road legal. Specifically, uninsured drivers cost insurance companies and the insurance industry millions of dollars each year. In the UK, more than 30,000 claims are caused annually by uninsured drivers, resulting in payouts of over £400 million. This is a charge of £30 for every honest driver's insurance policy. Similar statistics apply in other jurisdictions.

Therefore, a reporting action at block 430 may provide information to government agencies and may include information such as time and date of the vehicle being in use, a location, and may further provide additional camera-based evidence such as snapshots, video, among other options. Reporting may be done automatically without user intervention.

If the risk profile finds none of the surrounding or proximate vehicles pose an elevated risk, the action at block 430 may be to not provide any alerts and to use default behavior for autonomous vehicles.

Figure 5:
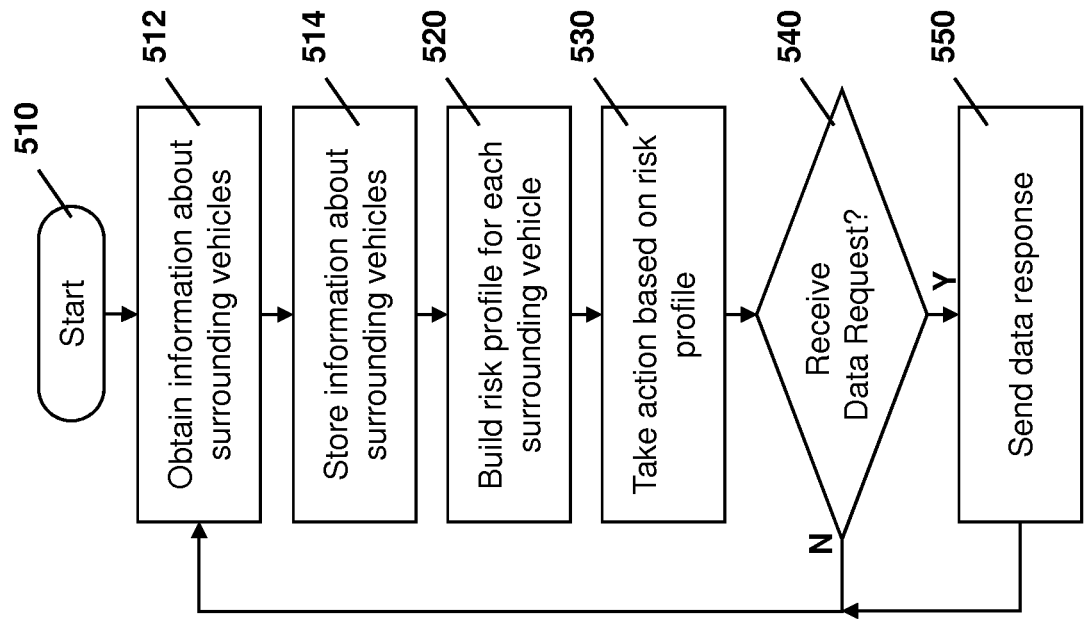
FIG. 5 is a process diagram showing a process for storing information about surrounding vehicles and providing the stored information on request.

In a further embodiment, stored information may be used to aid police agencies. For example, reference is now made to FIG. 5. In the embodiment of FIG. 5 the process starts at block 510 and proceeds to block 512, in which information is obtained about surrounding vehicles. Such action may be similar to that described above with regard to block 412.

The process then proceeds to block 514 in which the information about surrounding vehicles is stored.

The process then proceeds to block 520 in which a risk profile is built with regard to the surrounding vehicles. The process of block 520 may be similar to the process of block 420.

The process then proceeds to block 530 in which an action may be taken based on the risk profile. The action may be similar to that described above with regard to block 430.

The process then proceeds to block 540 in which a check is made to determine whether a request has been received by the computing device for information. For example, if police are looking for a vehicle with a particular license plate, they may use a system in which vehicles may be queried to determine whether the computing device has stored information about the desired vehicle. For example, if a license plate of a vehicle known to be involved in a robbery is conveyed to a plurality of vehicle computing devices, such computing devices may return an indication of whether information about such license plate was stored recently or within a determined time period.

Thus, the check at block 540 determines whether a request has been received. If not, the process continues to loop back to block 512.

If a request is received, as determined at block 540, the process proceeds to block 550 in which the data about the requested vehicle, including for example time, date, location and potentially pictures or video of the vehicle may be provided to the police to allow for police investigations.

The process may then loop back from block 550 to block 512.

In addition to building the risk profile of blocks 520 or 420, the risk profile may further be enhanced to create a risk profile for a given route. In particular, reference is now made to FIG. 6.

Figure 6:
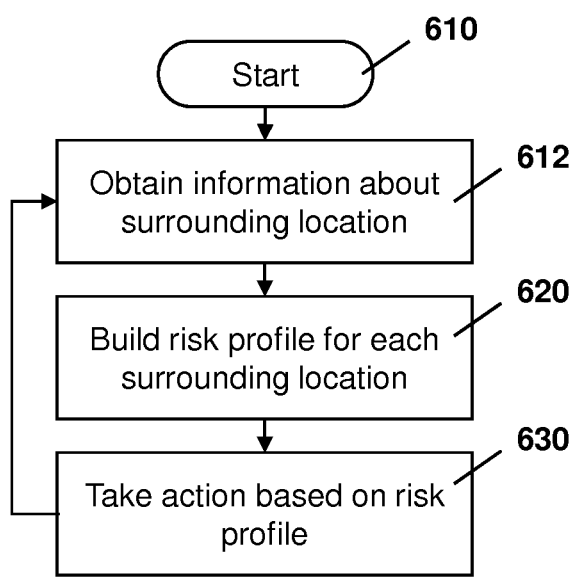
FIG. 6 is a process diagram showing a process for building a risk profile for the surrounding location.

The process of FIG. 6 starts at block 610 and proceeds to block 612 in which the vehicle obtains information about the surrounding area. The information may be publicly available data such as crime statistics, and may be further refined to vehicle crime statistics.

Other statistics, such as collision statistics indicating a high-risk intersection, among other such data may also be obtained.

Based on such data, the process proceeds to block 620 and builds a risk profile for the given location and route.

The process then proceeds to block 630 in which an action is made based on the risk profile. For example, the additional context for the risk profile can help determine decisions about a journey, whether the vehicle may seek an alternative route, whether the vehicle should park in a particular location, or help the vehicle identify a secure location to stop or park.

From block 630 the process proceeds to back to block 612.

Based on the above, a vehicle may create a risk profile for surrounding or proximate vehicles, and/or based on location, using information about the proximate vehicles or surrounding area, and then take action based on the risk profile.

A server such as servers 240, 242 or 250 may be any network node. For example, one simplified server that may perform the embodiments described above is provided with regards to FIG. 7.

Figure 7:
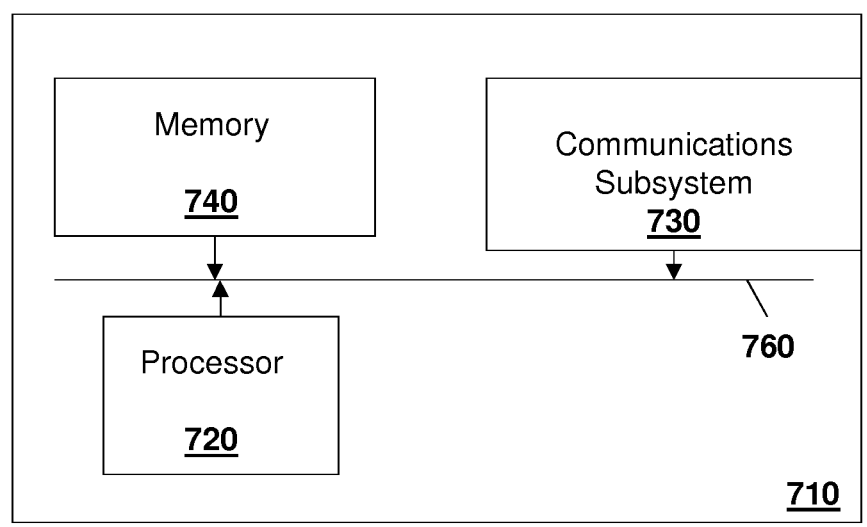
FIG. 7 is a block diagram of an example computing device capable of being used in accordance with the embodiments of the present disclosure.

In FIG. 7, server 710 includes a processor 720 and a communications subsystem 730, where the processor 720 and communications subsystem 730 cooperate to perform the methods of the embodiments described herein.

The processor 720 is configured to execute programmable logic, which may be stored, along with data, on the server 710, and is shown in the example of FIG. 7 as memory 740. The memory 740 can be any tangible, non-transitory computer readable storage medium, such as optical (e.g., CD, DVD, etc.), magnetic (e.g., tape), flash drive, hard drive, or other memory known in the art. In one embodiment, processor 720 may also be implemented entirely in hardware and not require any stored program to execute logic functions.

Alternatively, or in addition to the memory 740, the server 710 may access data or programmable logic from an external storage medium, for example through the communications subsystem 730.

The communications subsystem 730 allows the server 710 to communicate with other devices or network elements.

Communications between the various elements of the server 710 may be through an internal bus 760 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method of a computing device in a first vehicle, the method comprising:
receiving, at the computing device in the first vehicle, image data acquired by a camera of the first vehicle, the image data comprising an image of a license plate of a second vehicle;

obtaining, by the computing device based on information of the license plate, information comprising a maintenance history of the second vehicle, the maintenance history comprising information regarding a worn or failed component of the second vehicle;

utilizing the maintenance history comprising the information regarding the worn or failed component of the second vehicle, creating, by the computing device, a risk profile for the second vehicle; and based on the risk profile, initiating, by the computing device, an action comprising autonomously changing a position of the first vehicle relative to the second vehicle.

2. The method of claim 1, comprising:

applying optical character recognition on the image of the license plate to obtain the information of the license plate; and performing a database query based on the information of the license plate to obtain the maintenance history.

3. The method of claim 1, comprising:

based on an image of the second vehicle acquired by the camera, determining, by the computing device, a vehicle make and model of the second vehicle; and confirming that the information of the license plate matches the vehicle make and model.

4. The method of claim 1, wherein the first vehicle is an autonomous vehicle, and wherein the action comprises increasing a following distance between the first vehicle and the second vehicle.

5. The method of claim 1, wherein the first vehicle is an autonomous vehicle, and wherein the action comprises the first vehicle changing lanes.

6. The method of claim 1, wherein the first vehicle is an autonomous vehicle, and wherein the action comprises allowing the second vehicle to pass.

7. The method of claim 1, wherein the action further comprises alerting a driver if the risk profile exceeds a threshold risk.

8. The method of claim 1, comprising:

determining, based on the maintenance history, that the second vehicle has the worn or failed component, wherein the creating of the risk profile is based on the determining.

9. A computing device for a first vehicle, the computing device comprising:

a processor;

a communications subsystem; and a non-transitory storage medium storing instructions executable on the processor to:

receive image data acquired by a camera of the first vehicle, the image data comprising an image of a license plate of a second vehicle;

obtain, based on information of the license plate, information comprising a maintenance history of the second vehicle, the maintenance history comprising information regarding a worn or failed component of the second vehicle;

utilizing the maintenance history comprising the information regarding the worn or failed component of the second vehicle, create a risk profile for the second vehicle; and based on the risk profile, initiate an action at the first vehicle, the action comprising autonomously changing a position of the first vehicle relative to the second vehicle.

10. The computing device of claim 9, wherein the non-transitory storage medium stores further instructions executable on the processor to:

apply optical character recognition on the image of the license plate to obtain an identification of the second vehicle;

and perform a database query based on the identification to obtain the maintenance history.

11. The computing device of claim 9, wherein the non-transitory storage medium stores further instructions executable on the processor to:

based on an image of the second vehicle acquired by the camera, determine a vehicle make and model of the second vehicle;

and confirm that the information of the license plate matches the vehicle make and model.

12. The computing device of claim 9, wherein the first vehicle is an autonomous vehicle, and wherein the action comprises increasing a following distance between the first vehicle and the second vehicle.

13. The computing device of claim 9, wherein the first vehicle is an autonomous vehicle, and wherein the action comprises the first vehicle changing lanes.

14. The computing device of claim 9, wherein the first vehicle is an autonomous vehicle, and wherein the action comprises allowing the second vehicle to pass.

15. The computing device of claim 9, wherein the non-transitory storage medium stores further instructions executable on the processor to: determine, based on the maintenance history, that the second vehicle has the worn or failed component, wherein the creating of the risk profile is based on the determining.

16. The computing device of claim 9, wherein the non-transitory storage medium stores further instructions executable on the processor to: obtain collision statistics of an intersection, wherein the creating of the risk profile is further based on the collision statistics.

17. A non-transitory computer readable medium storing instructions that upon execution cause a computing device in a first vehicle to:

receive image data acquired by a camera of the first vehicle, the image data comprising an image of a license plate of a second vehicle;

obtain, at the first vehicle based on information of the license plate, information comprising a maintenance history of the second vehicle, the maintenance history comprising information regarding a worn or failed component of the second vehicle;

utilizing the maintenance history comprising the information regarding the worn or failed component of the second vehicle, create, at the first vehicle, a risk profile for the second vehicle; and based on the risk profile, initiate an action at the first vehicle, the action comprising autonomously changing a position of the first vehicle relative to the second vehicle.

18. The non-transitory computer readable medium of claim 17, comprising further instructions that upon execution cause the computing device to: determine, based on the maintenance history, that the second vehicle has the worn or failed component, wherein the creating of the risk profile is based on the determining.

19. The non-transitory computer readable medium of claim 17, comprising further instructions that cause the computing device to: obtain collision statistics of an intersection, wherein the creating of the risk profile is further based on the collision statistics.

\* \* \* \* \*

UNITED STATES PATENT AND TRADEMARK OFFICE
CERTIFICATE OF CORRECTION

PATENT NO. : 11,548,513 B2  
APPLICATION NO. : 16/611343  
DATED : January 10, 2023  
INVENTOR(S) : Adam John Boulton Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this  
Twenty-third Day of July, 2024

Katherine Kelly Vidal  
*Director of the United States Patent and Trademark Office*